Sept. 30, 1958  A. F. ROOT  2,854,106
AUXILIARY THROTTLE CONTROL FOR MOTOR VEHICLES
Filed Feb. 26, 1957
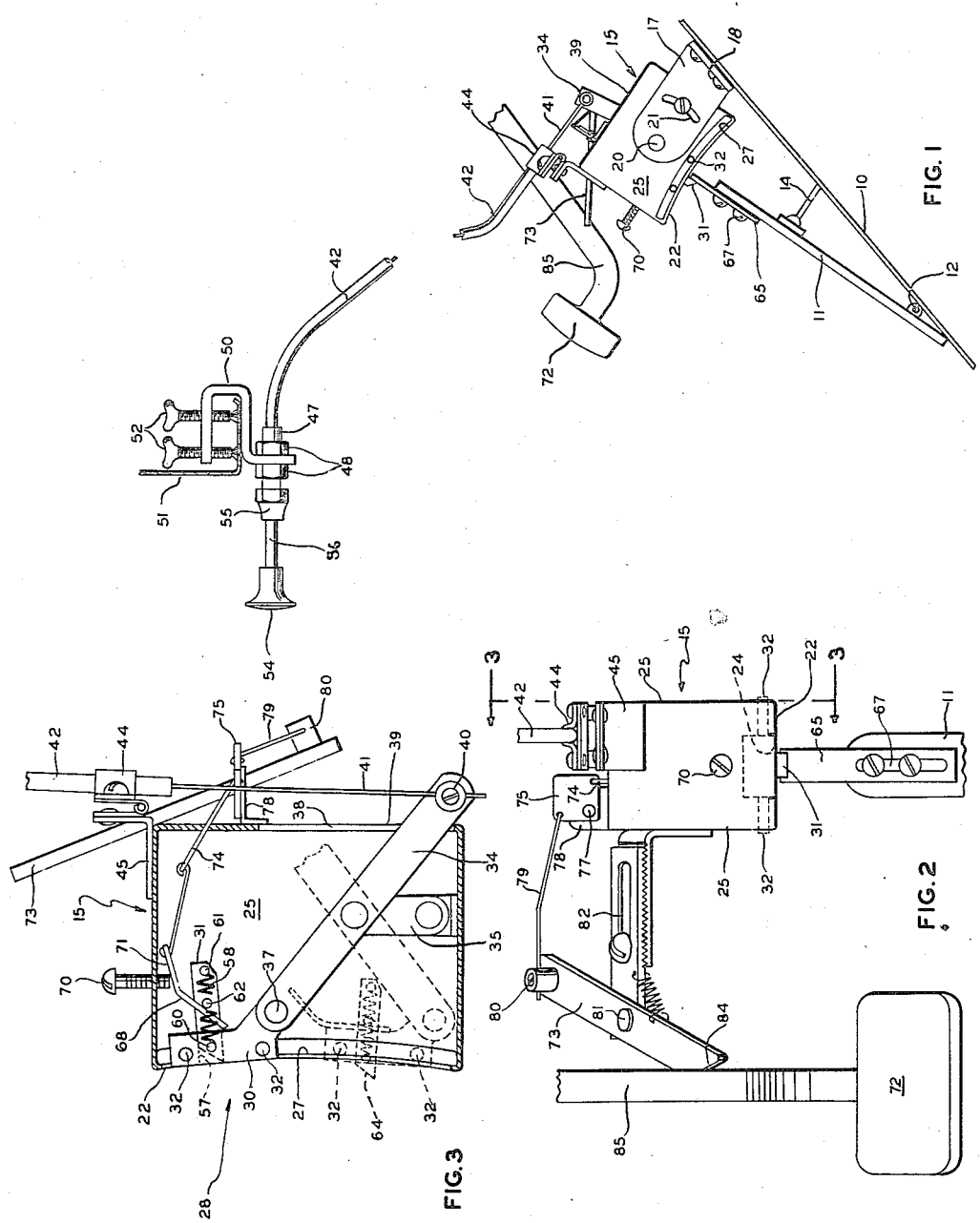
INVENTOR.
ADELBERT F. ROOT
BY
Attorney

United States Patent Office 2,854,106
Patented Sept. 30, 1958

2,854,106

AUXILIARY THROTTLE CONTROL FOR MOTOR VEHICLES

Adelbert F. Root, Manlius, N. Y.

Application February 26, 1957, Serial No. 642,532

9 Claims. (Cl. 192—3)

This invention relates generally to motor vehicle controls, and has particular reference to an improved auxiliary throttle control which enables the accelerator pedal of the vehicle to be releasably held in a selected position without the necessity of exerting foot pressure on it.

At the present time, more and more express type highways are being built throughout the country, and on most of them it is possible to drive for long stretches at a constant rate of speed because normal highway and traffic hazards have been reduced to a minimum. However, when uniform pressure is exerted on the accelerator pedal for an extended period of time, the foot and leg muscles become unduly fatigued with the result that the driver becomes generally uncomfortable and driving becomes a chore. The present invention contemplates the elimination of this foot and leg fatigue by providing a manually adjustable auxiliary control which is operable to mechanically hold the accelerator pedal in any selected position within reasonable limits. To insure absolute safety, however, the control is arranged so that the mechanical holding means is instantly released from the accelerator pedal whenever the brake pedal is operated, and the control can also be manually adjusted to a completely inoperative position, as for example under certain conditions of heavy traffic, or on any other occasion when the driver does not wish to use it.

The applicant is aware that mechanical devices for controlling an accelerator pedal have been developed heretofore. The great majority of these, however, provide for a manually operated release or must be released by an independent foot lever and thus have been objected to as unsafe since the trained driver instinctively operates his brake pedal when he wishes to slow his vehicle or stop completely. A few designers have recognized the inherent danger in the above mentioned type of control and have developed controls having brake actuated releasing means but these controls have generally involved relatively complex structures and have also been criticized as being too expensive or difficult to install in the vehicle.

With the foregoing and other considerations in view, it may be stated that the primary object of the present invention is to provide an auxiliary control for mechanically holding a motor vehicle accelerator pedal in a selected position which control is both safe and practical to use.

Another important object of the invention is to provide an auxiliary control for mechanically holding a motor vehicle accelerator pedal in a selected position which control is automatically disengaged from the accelerator pedal upon actuation of the brake pedal.

Still another important object of the invention is to provide an auxiliary control for a motor vehicle accelerator pedal which control may be manually adjusted to hold the pedal in any selected position or may be adjusted to a completely inoperative position.

A further important object of the invention is to provide an auxiliary control for a motor vehicle accelerator pedal which control may be manually adjusted to hold the pedal in any selected position and will remain in its adjusted position even after the accelerator pedal has been disengaged therefrom by actuation of the brake pedal, whereby said accelerator pedal may be returned to the selected position by simply depressing it with the foot until it is re-engaged by the control.

A still further important object of the invention is to provide an auxiliary control for mechanically holding a motor vehicle accelerator pedal in a selected position which control is easy to install and is provided with adjustment means whereby it may be adapted for use in any model or make of modern vehicle.

Still another important object of the invention is to provide an auxiliary control for mechanically holding a motor vehicle accelerator pedal in a selected position which control is inexpensive to manufacture and yet is strong and durable.

Other objects and advantages of the invention will become apparent from the following detailed description thereof read in conjunction with the accompanying drawings which illustrate a representative embodiment of the invention for the purpose of disclosure.

Figure 1 is a side elevation of an auxiliary throttle control embodying the invention, showing the relation of the control to the accelerator and brake pedals of the vehicle;

Figure 2 is a top plan view of the control illustrated in Figure 1; and

Figure 3 is an enlarged vertical section through the control housing taken substantially along line 3—3 of Figure 2.

Having reference now to the drawings, wherein like reference numbers designate the same parts in each of the views, and with particular reference to Figure 1, 10 indicates a portion of the floorboard of a motor vehicle and 11 is a conventional accelerator pedal which is pivotally secured adjacent its rear end to the floorboard as by a hinged connection 12. On its underside, the pedal 11 engages a rod 14 which passes through the floorboard and is operably connected to the throttle valve (not shown) of the vehicle engine or motor in the usual manner.

Mounted adjacent the free or front end of the accelerator pedal 11 is a housing 15 forming a part of the auxiliary throttle control, the housing being supported by a bracket 17 which is secured as by screws 18 to the floorboard. The housing is attached to the bracket by a pivotal connection 20 and a screw and slot connection 21 so that it can be angularly adjusted to bring its slightly concave rear wall 22 into approximate concentric relationship with the path travelled by the front end of the accelerator pedal 11 as it pivots about the connection 12.

The rear wall 22 of the housing is formed with a centrally disposed vertical slot 24, Figure 2, and the side walls 25 thereof are formed with slots 27 which are located next to the rear wall and conform to its curvature. A latch mechanism, generally indicated at 28 is slidably mounted in the housing for reciprocable movement therein, and this mechanism is essentially comprised of a plunger 30 and a detent 31 slidably mounted in the plunger. Plunger 30 abuts against the rear wall of the housing and is mounted in this position and guided during its movement by a pair of pins 32 which extend outwardly from the sides of the plunger and are received in the slots 27. The detent 31 is adapted to project through the slot 24 for engagement with the accelerator pedal so that the movement of the plunger will control the position of the pedal as will be more fully described hereinafter.

The actuating means for the plunger includes a lever 34 which is rockably mounted on an upstanding bracket 35 in the housing and is fastened at one end to the plunger as by a pivotal connection 37. The other end of the lever extends through a slot 38 in the front wall 39 of the housing and is fastened as by a set screw connection 40 to a Bowden wire comprising a flexible wire 41 housed within a flexible tube 42, the latter having one end secured as by a hinged clip 44 to a bracket 45 on the housing. The Bowden wire is provided to permit actuation of the plunger 30 from a point remote from the accelerator pedal and within easy reach of the vehicle driver and, to this end, the other end of the flexible tube 42 is secured as by a threaded ferrule 47 and a pair of nuts 48 to a bracket 50 which may be attached to the vehicle dashboard 51 by any suitable means such as bolts 52.

The inner flexible wire 30 terminates adjacent the dashboard in a manually operable control knob 54, and it will be apparent from Figures 1 and 3 that movement of this knob towards or away from the dashboard will rock the lever 34 about its pivot point on bracket 35 and thereby impart reciprocable movement to the plunger 30. In order to insure that the plunger will be held in any position to which it is moved by the knob 54, a nut 55 having a resilient insert (not shown) is threaded onto the outer end of the ferrule adjacent the knob, the insert frictionally engaging a rod 56 which is fixed to the outer end of the wire 41 so that the plunger will not move except upon the application of a positive force. The amount of frictional resistance afforded by the insert may be varied by tightening or loosening the nut 55.

The accelerator pedal engaging detent 31 is mounted in a transverse slot 57 in the plunger 30 and is biased outwardly through the slot 24 in the rear wall of the housing by means of a pair of tension springs 58 located on either side of the detent. Each spring is connected at one end to a pin 60 on the plunger and at the other end to a pin 61 at the inner extremity of the detent. A second pin 62 passes through the detent at the approximate mid-point thereof and serves as a stop to limit the outward projection of the detent beyond the rear wall of the housing. The outwardly projecting end of the detent is bevelled as indicated at 64, and the under side thereof is adapted to engage the accelerator pedal in overlying relation thereto as is best shown in Figure 1. However, since the pedal is usually rubber covered and may have a somewhat rounded front edge, a thin adapter or extension plate 65 is preferably mounted on the pedal for actual engagement by the detent. The plate 65 is preferably secured to the pedal by a screw and slot connection 67, Figure 2, so that its position can be accurately adjusted to insure positive engagement with the detent and still have its end clear the rear wall 22 of the housing.

Mounted on the detent 31 between the plunger 30 and pin 62 is an angle plate 68 which is normally held against the plunger by the springs 58 as indicated in dash lines in Figure 3. A set screw 70 extends through the top of the housing and, as the plunger is moved towards its upper position in the housing, this screw engages the upper oblique portion 71 of the angle plate and cams it away from the plunger against the action of the springs 58, the angle plate pivoting on its bottom edge when this occurs. As the plate pivots away from the plunger, it moves the pin 62, and thus the detent, inwardly until the bevelled end 64 of the detent no longer projects beyond the back wall of the housing and the control device is made completely inoperable since there is no engagement with the accelerator pedal. This position is shown in solid lines in Figure 3, and at this time the control knob 54 on the dashboard is in its innermost position.

When the control knob is pulled outwardly, lever 34 pivots and moves the plunger downwardly in the housing, and as soon as the angle plate 68 clears the screw 70, the springs 58 pull it back into abutment with the plunger and the end 64 of the detent again projects outwardly from the housing. If the control knob is pulled out farther, the plunger continues its downward movement and the detent engages the adapter plate 65 so that the free end of the accelerator pedal is in turn moved downwardly, or is depressed. The position of the pedal and therefore the speed of the vehicle may thus be selectively controlled by the knob 54 and the pedal will be held in the selected position by the action of the friction nut 55. Pushing the control knob inwardly, of course, moves the plunger upwardly and permits the pedal to return towards its normal or undepressed engine idling position.

In order to disengage the detent 31 from the accelerator pedal whenever the brake pedal 72 is actuated, regardless of the position of the plunger 30, the angle plate 68 is connected to a rockable lever 73, Figure 2, which is actuated upon the operation of the brake pedal to pivot the plate away from the plunger in the same manner as is done by a set screw 70. To this end, a linkage 74 is connected at one end to the upper edge of the angle plate and at its other end to one corner of a rocker plate 75 which is pivotally secured as at 77 to a bracket 78 on the housing. The diagonally opposite corner of the rocker plate is connected to one end of a link 79 which is secured at its other end as by a set screw connection 80 to the lever 73.

The lever 73 is pivotally connected as at 81 to an adjustable extension arm 82 secured to the housing, the adjustable arm enabling the lever to be properly located with respect to the brake pedal regardless of the make or model of the vehicle. The end of the lever 73 opposite the link 80 is bevelled or inclined as at 84, and is positioned beneath the brake pedal arm 85, Figures 1 and 2, so that depression of the brake pedal will cause the arm to cam or pivot the lever in a counter-clockwise direction as viewed in Figure 2. This causes link 79 to rock the rocker plate 75 counter-clockwise so that the linkage 74 is moved towards the front wall of the housing and the angle plate 68 is pivoted away from the plunger thereby disengaging the detent from the accelerator pedal. This permits the pedal to return to normal position where it will be above the detent and no longer affected thereby.

Upon releasing the brake pedal 72, the detent springs 58 immediately move the detent back into outwardly projecting position and the angle plate 68 is moved back into abutment with the plunger. This causes the rocker plate 75 and lever 73 to be pivoted in the clockwise direction, and again positions the latter beneath the brake pedal arm. During the application of the brake, and even though the accelerator pedal has been released, the plunger remains in its selected position, and the operator of the vehicle may re-engage the accelerator pedal with the detent by simply depressing the pedal with his foot. Thus, as the pedal is being depressed, it engages the upper bevelled side of the detent and cams it into the housing until the pedal is below the detent whereupon the latter again springs outwardly into overlying engagement with the pedal to hold it in the desired position.

While the brake pedal arm has been illustrated as being of the depending type, it will be understood that the invention can also be employed in a vehicle having a brake arm which extends upwardly through the floorboard by simply mounting on the upstanding pedal arm a suitable camming plate which will actuate the lever 73 when the brake pedal is depressed. It will also be understood that while the invention has been particularly described with relation to motor vehicles such as automobiles, it can also be utilized advantageously with vehicles such as boats having an automotive type accelerator pedal arrangement.

The invention may be embodied in other specific forms without departing from the spirit or essential characteristics thereof. The embodiment disclosed is therefore to be considered in all respects as illustrative and not restric-

What is claimed is:

1. In combination with the accelerator and brake pedals of a motor vehicle, an auxiliary throttle control comprising a housing mounted adjacent the accelerator pedal, a latch mechanism slidably mounted for reciprocable movement in said housing and having a portion thereof engageable with said accelerator pedal in overlying relation thereto, movement of said latch mechanism in one direction during engagement of said portion with said pedal causing depression of the pedal and movement in the opposite direction permitting the pedal to return towards its undepressed engine idling position, means operable from a point remote from said pedals to actuate said latch mechanism, and means actuated by said brake pedal to disengage said accelerator pedal engaging portion of the lach mechanism from the accelerator pedal.

2. In combination with the accelerator pedal of a motor vehicle, said pedal being pivotally secured adjacent one end to the vehicle floorboard, an auxiliary throttle control comprising a housing mounted above the vehicle floorboard adjacent the free end of said pedal, a latch mechanism supported by said housing including a reciprocably movable plunger member and a detent slidably mounted in the plunger member, said detent normally projecting outwardly from said plunger member and engaging the free end of said pedal when said auxiliary control is in use, means operable from a point remote from said pedal to selectively move said plunger member to any point on its reciprocable movement path, movement of said member causing said detent to depress said pedal or permit it to return towards its undepressed engine idling position, and means operable to disengage said detent from said pedal regardless of the position of the plunger member in its reciprocable movement path.

3. Structure as defined in claim 2 together with means in said housing operable to retract said detent from its outwardly projecting pedal engaging position when said plunger member is moved to one end of its reciprocable movement path, said detent retracting means being utilized whenever it is not desired to use said auxiliary throttle control.

4. In an auxiliary throttle control for a motor vehicle having accelerator and brake pedals, said accelerator pedal being pivotally secured adjacent one end to the vehicle floorboard, a plunger member, means supporting said member for slidable reciprocable movement substantially normal to the plane of said accelerator pedal, a detent movably mounted in said member and normally projecting outwardly therefrom in overlying engagement with the free end of said accelerator pedal when said auxiliary control is in use whereby reciprocable movement of the plunger member depresses the pedal or permits it to return towards its undepressed engine idling position, means operable from a point remote from said pedals to actuate said plunger member movement, and means actuated by said brake pedal to move said detent relative to said plunger to disengage the detent from said accelerator pedal regardless of the position of the plunger member in its reciprocable movement path.

5. In an auxiliary throttle control for a motor vehicle having adjacent accelerator and brake pedals, said accelerator pedal being pivotally secured adjacent its rear end to the vehicle floorboard, a housing mounted above said floorboard adjacent the front end of said accelerator pedal, a plunger slidably mounted in said housing for reciprocable movement substantially normal to the plane of said accelerator pedal, means operable from a point remote from said pedals to move said plunger to any selected position in its reciprocable movement path, means coacting with said last-named means to hold said plunger in the position to which it is moved, a detent slidably mounted in said plunger for reciprocable movement substantially normal to the direction of movement of the plunger, biasing means urging said detent to project outwardly from said plunger in overlying engagement with said accelerator pedal whereby selective movement of the plunger operates to selectively move the pedal, linkage means connected to said detent and operable against the action of said biasing means to disengage the detent from said accelerator pedal and release the latter from the position to which it has been moved by said plunger, and means operable upon depressing said brake pedal to actuate said linkage means.

6. In an auxiliary throttle control for a motor vehicle having adjacent accelerator and brake pedals, said accelerator pedal being pivotally secured adjacent its rear end to the vehicle floorboard and having an extension member adjustably secured to the front end thereof, a housing mounted on said floorboard adjacent the front end of said accelerator pedal, a plunger slidably mounted in said housing for reciprocable movement substantially normal to the plane of said accelerator pedal, a detent slidably mounted in said plunger for reciprocable movement substantially parallel to the plane of said accelerator pedal, said detent normally projecting outwardly from said plunger and housing and engaging said extension member in overlying relation thereto when said auxiliary control is in use, a lever pivotally secured intermediate its ends to said housing, one end of said lever being secured to said plunger, actuating means secured to the opposite end of said lever and operable from a point remote from said housing to rock the lever and thereby move said plunger and accelerator pedal to any selected position, and means actuated by said brake pedal to disengage said detent from said accelerator pedal extension member regardless of the position of said plunger in its reciprocable movement path.

7. Structure as defined in claim 6 together with means in said housing operable to cam said detent out of engagement with said extension member when said plunger member is moved to one end of its reciprocable movement path, said detent retracting means being utilized whenever it is not desired to use said auxiliary throttle control.

8. In an auxiliary throttle control for motor vehicles having adjacent accelerator and brake pedals, said accelerator pedal being pivotally secured adjacent one end to the vehicle floorboard, a housing mounted on said floorboard adjacent the free end of said accelerator pedal, a plunger slidably mounted in said housing for reciprocable movement substantially normal to the plane of said accelerator pedal, means operable from a point remote from said housing to move said plunger to any selected position in its reciprocable movement path, a detent slidably mounted in said plunger and normally projecting outwardly therefrom and from said housing in overlying engagement with the free end of said accelerator pedal when said auxiliary control is in use whereby selective movement of the plunger operates to selectively move the pedal, extension means projecting from said housing and terminating adjacent said brake pedal, rockable means mounted on said extension means, and means operably connecting said rockable means with said detent, said rockable means being actuated upon the depression of said brake pedal to disengage said detent from said accelerator pedal regardless of the position of said plunger in its reciprocable movement path.

9. Structure as defined in claim 8 wherein said extension means is adjustable.

References Cited in the file of this patent

UNITED STATES PATENTS

| | | |
|---|---|---|
| 1,560,274 | McLam et al. | Nov. 3, 1925 |
| 1,855,538 | Abel | Apr. 26, 1932 |
| 2,568,454 | Leverents | Sept. 18, 1951 |
| 2,755,684 | Russell | July 24, 1956 |